(12) United States Patent
Karri et al.

(10) Patent No.: US 11,426,774 B1
(45) Date of Patent: Aug. 30, 2022

(54) DUST REMOVAL METHOD AND SYSTEM IN ROLLABLE DISPLAY DEVICE

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 17/185,815

(22) Filed: Feb. 25, 2021

(51) Int. Cl.
*G09F 9/30* (2006.01)
*B08B 7/02* (2006.01)
*F16M 13/00* (2006.01)
*G01N 21/94* (2006.01)

(52) U.S. Cl.
CPC ........... *B08B 7/028* (2013.01); *F16M 13/005* (2013.01); *G01N 21/94* (2013.01); *G09F 9/301* (2013.01); *F16M 2200/02* (2013.01)

(58) Field of Classification Search
CPC ...... G06F 1/1641; G06F 1/1652; G09F 9/301; G01N 21/94; B08B 7/028; F16M 2200/02
See application file for complete search history.

(56) References Cited

U.S. PATENT DOCUMENTS

| | | | |
|---|---|---|---|
| 8,493,714 B2 | 7/2013 | Visser et al. | |
| 9,566,947 B2* | 2/2017 | Huth | B60S 1/566 |
| 9,625,948 B2 | 4/2017 | Zhang et al. | |
| 9,743,537 B2* | 8/2017 | Kim | H05K 5/02 |
| 11,147,171 B2* | 10/2021 | Kim | H05K 5/0217 |
| 11,243,566 B2* | 2/2022 | Moon | G06F 1/1616 |

FOREIGN PATENT DOCUMENTS

| | | | |
|---|---|---|---|
| CN | 1856234 A | | 11/2006 |
| CN | 111128055 A | | 5/2020 |
| JP | 2012123162 A | * | 6/2012 |

OTHER PUBLICATIONS

"Dust Detection Sensors"; retrieved from https://www.azosensors.com/equipment-category.aspx?cat=120 on Feb. 12, 2021.

(Continued)

*Primary Examiner* — Joe H Cheng
(74) *Attorney, Agent, or Firm* — Anthony Curro

(57) ABSTRACT

In a method for dust removal in a rollable display device, a control module activates rolling mechanisms and a dust removal mechanism of the rollable display device. The control module determines a first amount of dust particles on a display surface of the rollable display device using data from a dust detection mechanisms. When the first amount of dust particles is determined to exceed a threshold, the control module engages magnetic locks to lock the rolling mechanisms, and the dust removal mechanism continues to remove the dust from the display surface. The control module determines a second amount of dust particles on the display surface. When the second amount of dust particles is determined to fall below the threshold, the control module disengages the magnetic locks to release the rolling mechanisms. Dust removal mechanism may include piezoelectric strips or an ultrasound haptic effect generation module.

19 Claims, 7 Drawing Sheets

(56) References Cited

OTHER PUBLICATIONS

"Rollable OLEDs: introduction and market status"; retrieved from https://www.oled-info.com/rollable-oleds; Feb. 7, 2019.
Shao, Jay; "[Display Dynamics] For rollable displays, in-folding and out-folding must overcome technological challenges"; retrieved from https://omdia.tech.informa.com/OM005245/Display-Dynamics-For-rollable-displays-infolding-and-outfolding-must-overcome-technological-challenges; Oct. 8, 2019.

\* cited by examiner

DUST REMOVAL METHOD AND SYSTEM IN ROLLABLE DISPLAY DEVICE

BACKGROUND

The present invention relates to rollable display devices, and more specifically, to the removal of dust particles on the display surfaces of rollable display devices.

Flexible or rollable display devices allow the display to be rolled and unrolled to open and close the display. However, any dust particles on the display surface could scratch or otherwise damage the display surface while the display is being rolled or unrolled. Damage can also result when another device, such as an electronic pen, is used against the display surface while dust particles are present.

SUMMARY

Disclosed herein is a method for dust removal in a rollable display device, and a computer program product and system as specified in the independent claims. Embodiments of the present invention can be freely combined with each other if they are not mutually exclusive.

According to an embodiment of the present invention, in a method for dust removal in a rollable display device, a control module activates rolling mechanisms and a dust removal mechanism of the rollable display device. The control module determines a first amount of dust particles on a display surface of the rollable display device using data from a dust detection mechanisms. When the first amount of dust particles is determined to exceed a threshold, the control module engages magnetic locks to lock the rolling mechanisms, and the dust removal mechanism continues to remove the dust from the display surface. The control module determines a second amount of dust particles on the display surface. When the second amount of dust particles is determined to fall below the threshold, the control module disengages the magnetic locks to release the rolling mechanisms. Dust removal mechanism may include piezoelectric strips or an ultrasound haptic effect generation module.

DETAILED DESCRIPTION

Figure 1:
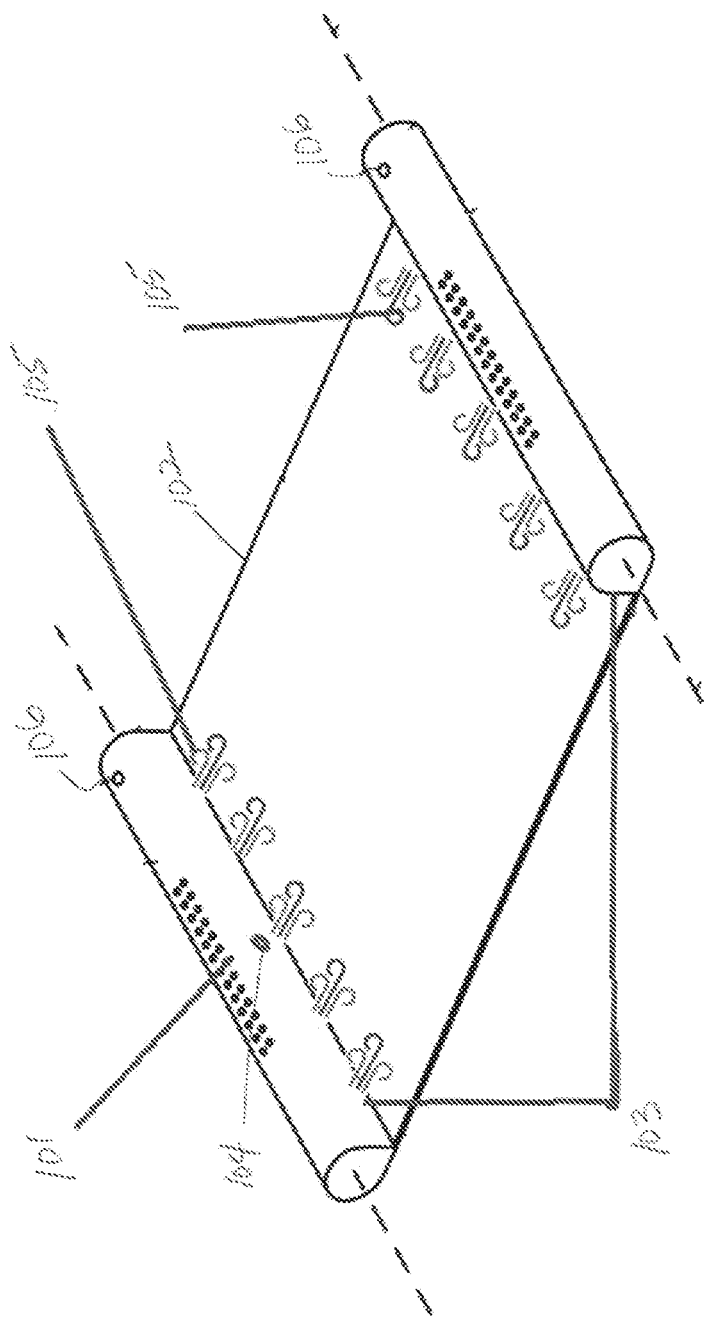
FIG. 1 illustrates a rollable display device according to an exemplary embodiment of the present invention.
Figure 2:
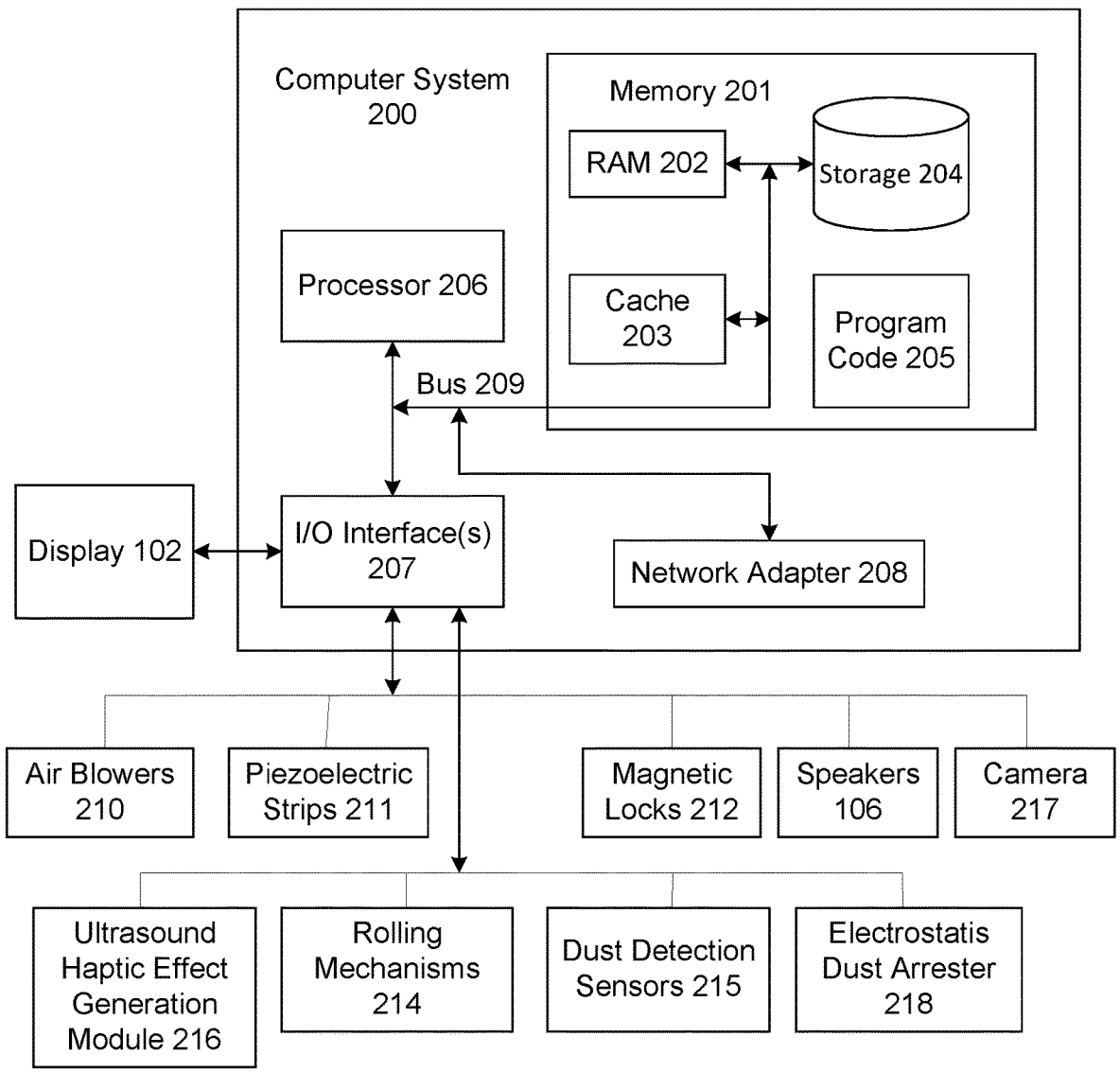
FIG. 2 illustrates a system of components of the rollable display device according to an exemplary embodiment of the present invention.

FIG. 1 illustrates a rollable display device according to an exemplary embodiment of the present invention. The rollable display device 101 includes a display surface 102 and frames 103. The frames 103 houses the hardware required to operate the rollable display device, as described further below. The display device 101 further includes one or more dust detection mechanisms 104 for detecting dust particles on the display surface 102 and one or more dust removal mechanisms 105 for removing the dust particles from the display surface 102. In one embodiment, the display device 101 further includes one or more speakers 106 for outputting audible notifications. The system of components of the device 101 reside in the frames 103, and their operation are managed by a control module, illustrated in FIG. 2. The control module 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The control module 200 may communicate with one or more networks via network adapter 208. The control module 200 may also communicate with one or more components via I/O interfaces 207. The components may include any combination of air blowers 210, piezoelectric strips 211, one or more magnetic locks 212, the speakers 106, dust detection sensors 215, an ultrasound haptic effect generator 216, a camera 217, and an electrostatic dust arrester 218. The components further include a set of rolling mechanisms 214, each of which comprise a set of gears (not shown) residing in each frame 103. To close the display 102, the gears roll in a first direction to retract the display 102 into each frame 103, resulting in the frames 103 moving toward each other. To open the display, the gears roll in a second and opposite direction to extract the display 102 out of the frames 103. The functioning of the components are further described below.

Figure 3:
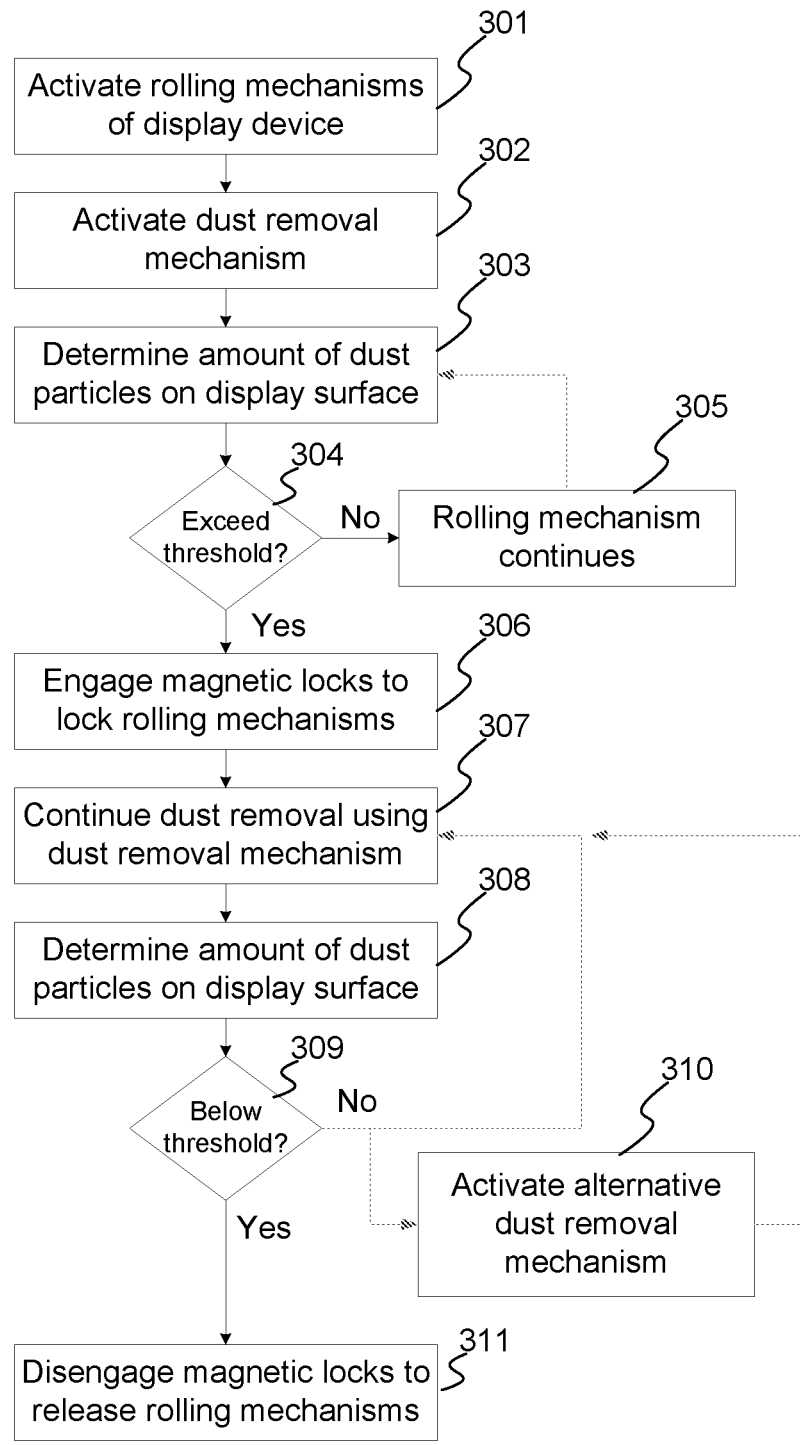
FIG. 3 illustrates a method for dust removal from a display surface of a rollable display device according to embodiments of the present invention.
Figure 4:
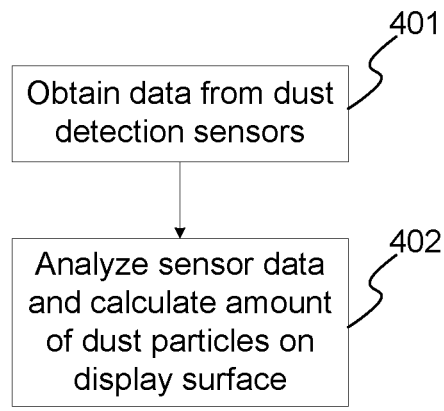
FIG. 4 illustrates use of dust detection sensors as a dust detection mechanism, according to an exemplary embodiment of the present invention.
Figure 5:
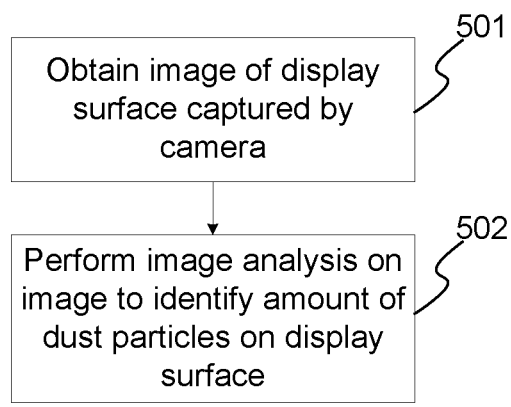
FIG. 5 illustrates use of a camera as a dust detection mechanism, according to an exemplary embodiment of the present invention.

FIG. 3 illustrates a method for dust removal from a display surface of a rollable display device according to an exemplary embodiment of the present invention. To roll or unroll the display 102, the control module 200 activates the rolling mechanisms 214 of the display device 101 (301). The control module 200 further activates the dust removal mechanism 105 (302). In one embodiment, the dust removal mechanism 105 comprises a set of air blowers 210, which expels air across the display surface 102 through openings in the frames 103. The control module 200 further determines an amount of dust particles on the display surface 102 (303). In one embodiment, the dust detection mechanism 104 comprises one or more dust detection sensors 215. Dust detection sensors 215 uses an optical sensing method to detect dust particles. Each dust detection sensor 215 includes a photosensor and an infrared light emitting diode (IR LED), where the photosensor detects the IR LED rays which bounce off any dust particles on the display surface 102. As illustrated in FIG. 4, the control module 200 obtains data from the dust detection sensors 215 (401). The control module 200 analyzes the sensor data and calculates the amount of dust particles on the display surface 102 based on the analysis (402). In another embodiment, the dust detection mechanism 104 comprises a camera 217. As illustrated in FIG. 5, the control module 200 obtains an image of the display surface 102 captured by the camera 217 (501). The control module 200 performs image analysis on the image to identify the amount of dust particles on the display surface 102 (502).

Returning to FIG. 3, once the amount of dust particles on the display surface 102 is determined by the control module 200 (303), the control module 200 determines whether the amount exceed a predetermined threshold (304). In one embodiment, when the amount of dust particles exceed the threshold, the control module 200 causes the speakers 106 to output an audible notification or causes the display 102, an LED light (not shown) on the frame 103, or some other suitable mechanism, to issue a visual notification. If the amount of dust particles does not exceed the threshold, then the rolling mechanisms 214 are allowed to continue rolling or unrolling the display 102 (305) while the dust removal mechanism 105 continues to remove dust particles from the display surface 102. The control module 200 monitors the amount of dust particles on the display surface 102, via blocks 303 and 304, periodically or continuously, as the display 102 is rolled or unrolled. If, at any time during the rolling or unrolling of the display 102, the control module 200 determines that the amount of dust particles on the display surface 102 exceed the threshold (304), the control module 200 engages the magnetic locks 212 to lock the rolling mechanisms 214 (306). If the rolling mechanisms 214 moves while the dust particles are present, the display surface 102 may be damages. Locking the rolling mechanisms 214 prevents this damage. While the rolling mechanisms 214 are locked, the dust removal mechanism 105 continues its dust removal function (307). The control module 200 periodically determines whether the amount of dust particles on the display surface 102 has fallen below the threshold (308 and 309). The determination of the amount of dust particles per block 308 can be performed similarly to or differently from the determination per block 303. For example, the determination per blocks 303 and 308 is performed using dust detection sensors 215. Alternatively, the determination per block 303 is performed using the dust detection sensors 215 while the determination per block 308 is performed using the camera 217, or vice versa. If the amount of dust particles fall below the threshold (309), the control module 200 disengages the magnetic locks 212 to release the rolling mechanisms 214 (311). The rolling or unrolling of the display 102 can thus continue.

Figure 6:
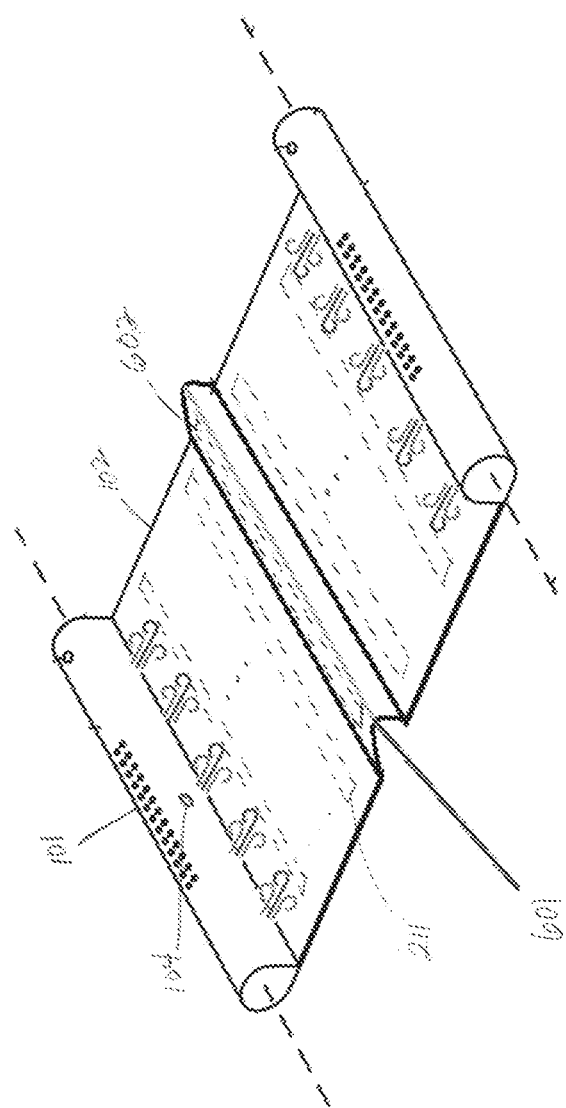
FIG. 6 illustrates a rollable display device according to another exemplary embodiment of the present invention.
Figure 7:
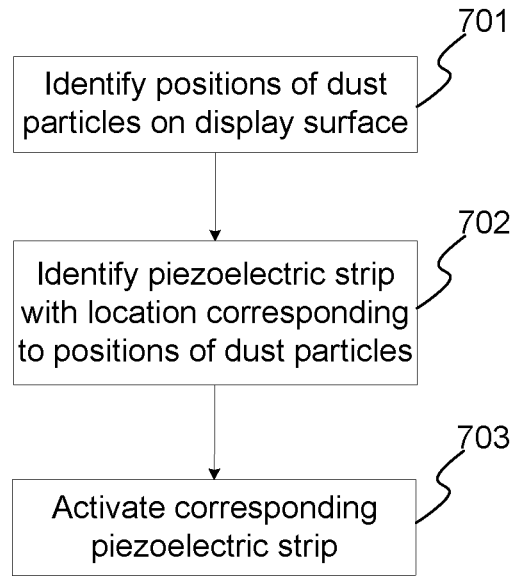
FIG. 7 illustrates use of piezoelectric strips as a dust removal mechanism, according to an exemplary embodiment of the present invention.

If the amount of dust particles have not fallen below the threshold (309), the dust removal using the dust removal mechanism 105 continues, and blocks 307 and 308 are repeated. Alternatively, upon determining that the amount of dust particles continues to exceed the threshold (309), the control module 200 activates an alternative dust removal mechanism (310). In one embodiment, as illustrated in FIG. 6, the alternative dust removal mechanism comprises a set of piezoelectric strips 211 (not drawn to scale) coupled to the back of the display 102. Electricity is passed through crystals in a piezoelectric strip 602, causing the crystals to vibrate. The vibration causes a portion 601 of the display surface 102 to deform, propelling dust particles on the portion 601 away from the display surface 102. An array of electric field generators (not shown) are also coupled to the back of the display 102, capable of providing the electricity to any of the piezoelectric strips 211. The array of electric field generators are powered by the display device battery (not shown), housed in the frames 103. As illustrated in FIG. 7, when determining the amount of dust particles on the display surface 102, the control module 200 identifies the positions of the dust particles on the display surface (701). The control module 200 then identifies the piezoelectric strip 602 of the set of piezoelectric strips 211 with a location corresponding to the positions of the dust particles (702). The control module 200 activates the corresponding piezoelectric strip 602 by causing electricity to be applied to the piezoelectric strip 602 (703). This results in the portion 601 of the display 102 at the location of the piezoelectric strip 602 to deform, propelling the dust particles away from the display surface 102.

Figure 8:
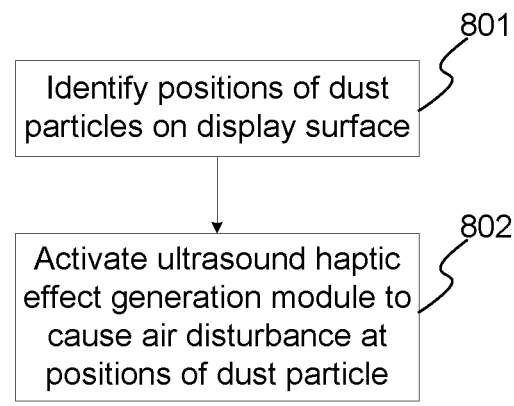
FIG. 8 illustrates use of an ultrasound haptic effect generation module as a dust removal mechanism, according to an exemplary embodiment of the present invention.

In another embodiment, the alternative dust removal mechanism comprises the ultrasound haptic effect generation module 216, coupled to the back of the display 102. The ultrasound haptic effect generation module 216 produces ultrasound to create an acoustic radiation force, causing air disturbance, which in turn propels dust particles away from the display surface 102. As illustrated in FIG. 8, when determining the amount of dust particles on the display surface 102, the control module 200 identifies the positions of the dust particles on the display surface (801). The control module 200 then activates the ultrasound haptic effect generation module to cause air disturbance at the positions of the dust particle (802).

In yet another embodiment, the alternative dust removal mechanism comprise an electrostatic dust arrester 218, which the control module 200 activates per block 310. The electrostatic dust arrester 218 charges the dust particles on the display surface 102 with electrostatic induction, propelling the dust particles away from the display surface 102.

Although the various dust removal mechanisms above are described in the context of being an alternative dust removal mechanism, any of the alternative dust removal mechanisms can be used as the primary dust removal mechanism 105 used in blocks 302 or 307.

Figure 9:
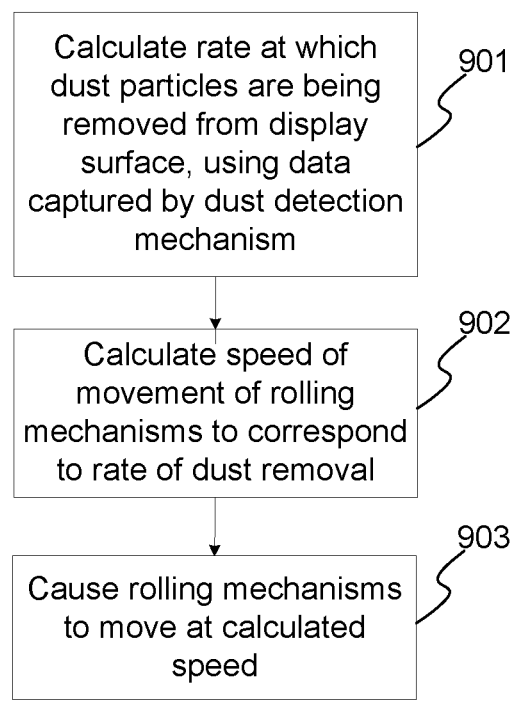
FIG. 9 illustrates controlling a rate of movement of rolling mechanisms of the display device, according to an exemplary embodiment of the present invention.

In one embodiment, when the control module 200 determines that the amount of dust particles on the display surface 102 exceeds the threshold (304), instead of engaging the magnetic locks 212, the control module 200 modifies the speed at which the rolling mechanisms 214 move. As illustrated in FIG. 9, using data captured by the dust detection mechanism 104, the control module 200 calculates the rate at which dust particles are being removed from the display surface 102 (901). The control module 200 then calculates a speed of movement of the rolling mechanisms 214 to correspond to the rate of the dust removal (902). The slower the rate of dust particle removal, the lower the speed of the rolling mechanisms 214 set by the control module 200. Similarly, the faster the rate of dust particle removal, the higher the speed of the rolling mechanisms 214 set by the control module 200. The control module 200 then causes the rolling mechanisms 214 to move at the calculated speed (903). The control module 200 periodically or continuously monitor the dust removal rate and adjusts the speed of the rolling mechanisms 214 accordingly.

In one embodiment, in addition to determining the amount of dust particles on the display surface 102, the control module 200 further determines the amount of dust particles in the air surrounding the display device 101. For example, the dust detection sensor 215, or an additional dust detection sensor (not shown), can be configured to detect dust particles in the surrounding air. The control module 200 then uses the combination of the dust particles detected on the display surface 102 and in the surrounding air to determine whether the amount of dust particles exceed the threshold per block 304. In one embodiment, the type of dust particle can also be identified by the control module 200. When the type of dust particle may cause an allergic reaction in a user, the control module 200 causes the speakers 106 to output an audible notification or causes the display 102, an LED light (not shown) on the frames 103, or some other suitable mechanism, to issue a visual notification. Whether the identified type of dust particle may cause an allergic reaction can be based on dust types commonly known to cause allergic reactions or custom set by the user of the display device 101.

In one embodiment, the control module 200 is configured to use images captured by the camera 217 to detect a person near the display device 101. The control module 200 is further configured to identify the person, and if a specific person or type of person is identified, the control module 200 causes the speaker 106 or display 102 to issue an audible or visual notification. For example, the control module 200 can be configured to cause the audible or visual notification when a child or an audibly or visually impaired person is detected nearby.

In one embodiment, the control module 200 is configured to communication with other devices in the surrounding area, such as other devices connected to a network configured as an Internet-of-Things (IoT) network. For example, when the IoT networked devices include another camera, the images captured by the other camera can be used by the control module 200 to detect whether a person is near the display device 101. In response, the control module 200 can cause the audible or visual notification as described above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dust removal in a rollable display device, comprising:
   activating rolling mechanisms of the rollable display device, by a control module of the rollable display device;
   activating a dust removal mechanism of the rollable display device, by the control module;
   determining a first amount of dust particles on a display surface of the rollable display device using data from a dust detection mechanisms of the rollable display device, by the control module;
   when the first amount of dust particles is determined to exceed a threshold, engaging magnetic locks to lock the rolling mechanisms, by the control module;
   continuing dust removal from the display surface using the dust removal mechanism, by the control module;
   determining a second amount of dust particles on the display surface, by the control module;
   when the second amount of dust particles is determined to fall below the threshold, disengaging the magnetic locks to release the rolling mechanisms, by the control module.

2. The method of claim 1, wherein the dust detection mechanism comprises one or more dust detection sensors, wherein the determining of the first amount of dust particles comprises:
   obtaining sensor data from the dust detection sensors, by the control module; and
   analyzing the sensor data and calculating the first amount of dust particles on the display surface based on the sensor data, by the control module.

3. The method of claim 1, wherein the dust detection mechanism comprises a camera, wherein the determining of the first amount of dust particles comprises:
   obtaining an image of the display surface captured by the camera, by the control module; and
   performing image analysis on the image to identify the first amount of dust particles, by the control module.

4. The method of claim 1, further comprising:
   when the second amount of dust particles is determined to continue to exceed the threshold, activating an alternative dust removal mechanism, by the control module.

5. The method of claim 4, wherein the alternative dust removal mechanism comprises a set of piezoelectric strips, wherein the activating of the alternative dust removal mechanism comprises:
   identifying positions of the dust particles on the display surface, by the control module;
   identifying a given piezoelectric strip of the set of piezoelectric strips with a location corresponding to the positions of the dust particles, by the control module; and
   activating the given piezoelectric strip, by the control module.

6. The method of claim 4, wherein the alternative dust removal mechanism comprises an ultrasound haptic effect generation module, wherein the activating of the alternative dust removal mechanism comprises:
   identifying positions of the dust particles on the display surface, by the control module; and
   activating the ultrasound haptic effect generation module to cause air disturbance at the positions of the dust particles, by the control module.

7. The method of claim 1, wherein the engaging of the magnetic locks to lock the rolling mechanisms comprises:
   calculating a rate at which the dust particles are being removed from the display surface, using the data captured by the dust detection mechanism, by the control module;
   calculating a speed of movement of the rolling mechanisms to correspond to the rate of dust removal, by the control module; and
   causing the rolling mechanisms to move at the calculated speed, by the control module.

8. A rollable display device, comprising:
   a display comprising a display surface; and
   a set of frames comprising a control module, the control module comprising a processor and a computer readable storage medium having program instructions embodied therewith, the program instructions readable by the processor to cause the processor to:
   activate rolling mechanisms of the rollable display device;
   activate a dust removal mechanism of the rollable display device;

determine a first amount of dust particles on the display surface using data from a dust detection mechanisms of the rollable display device;

when the first amount of dust particles is determined to exceed a threshold, engage magnetic locks to lock the rolling mechanisms;

continue dust removal from the display surface using the dust removal mechanism;

determine a second amount of dust particles on the display surface;

when the second amount of dust particles is determined to fall below the threshold, disengage the magnetic locks to release the rolling mechanisms.

9. The device of claim 8, wherein the dust detection mechanism comprises one or more dust detection sensors, wherein to determine the first amount of dust particles, the processor is further caused to:

obtain sensor data from the dust detection sensors; and analyze the sensor data and calculating the first amount of dust particles on the display surface based on the sensor data.

10. The device of claim 8, wherein the dust detection mechanism comprises a camera, wherein to determine the first amount of dust particles, the processor is further caused to:

obtain an image of the display surface captured by the camera; and perform image analysis on the image to identify the first amount of dust particles.

11. The device of claim 8, wherein the processor is further caused to:

when the second amount of dust particles is determined to continue to exceed the threshold, activate an alternative dust removal mechanism.

12. The device of claim 11, wherein the alternative dust removal mechanism comprises a set of piezoelectric strips, wherein to activate the alternative dust removal mechanism, the processor is further caused to:

identify positions of the dust particles on the display surface;

identify a given piezoelectric strip of the set of piezoelectric strips with a location corresponding to the positions of the dust particles; and activate the given piezoelectric strip.

13. The device of claim 11, wherein the alternative dust removal mechanism comprises an ultrasound haptic effect generation module, wherein to activate the alternative dust removal mechanism, the processor is further caused to:

identify positions of the dust particles on the display surface; and activate the ultrasound haptic effect generation module to cause air disturbance at the positions of the dust particles.

14. The device of claim 8, wherein to engage the magnetic locks to lock the rolling mechanisms, the processor is further caused to:

calculate a rate at which the dust particles are being removed from the display surface, using the data captured by the dust detection mechanism;

calculate a speed of movement of the rolling mechanisms to correspond to the rate of dust removal; and cause the rolling mechanisms to move at the calculated speed.

15. A computer program product for dust removal in a rollable display device, the computer program product comprising a computer readable storage medium having program instructions embodied therewith, the program instructions executable by a processor to cause the processor to:

activate rolling mechanisms of the rollable display device;

activate a dust removal mechanism of the rollable display device;

determine a first amount of dust particles on the display surface using data from a dust detection mechanisms of the rollable display device;

when the first amount of dust particles is determined to exceed a threshold, engage magnetic locks to lock the rolling mechanisms;

continue dust removal from the display surface using the dust removal mechanism;

determine a second amount of dust particles on the display surface;

when the second amount of dust particles is determined to fall below the threshold, disengage the magnetic locks to release the rolling mechanisms.

16. The computer program product of claim 15, wherein the dust detection mechanism comprises one or more dust detection sensors, wherein to determine the first amount of dust particles, the processor is further caused to:

obtain sensor data from the dust detection sensors; and analyze the sensor data and calculating the first amount of dust particles on the display surface based on the sensor data.

17. The computer program product of claim 15, wherein the dust detection mechanism comprises a camera, wherein to determine the first amount of dust particles, the processor is further caused to:

obtain an image of the display surface captured by the camera; and perform image analysis on the image to identify the first amount of dust particles.

18. The computer program product of claim 15, wherein the processor is further caused to:

when the second amount of dust particles is determined to continue to exceed the threshold, activate an alternative dust removal mechanism.

19. The computer program product of claim 15, wherein to engage the magnetic locks to lock the rolling mechanisms, the processor is further caused to:

calculate a rate at which the dust particles are being removed from the display surface, using the data captured by the dust detection mechanism;

calculate a speed of movement of the rolling mechanisms to correspond to the rate of dust removal; and cause the rolling mechanisms to move at the calculated speed.

* * * * *